United States Patent [19]

Takao et al.

[11] Patent Number: 4,479,186
[45] Date of Patent: Oct. 23, 1984

[54] METHOD AND APPARATUS FOR CONTROLLING AN INTERNAL COMBUSTION ENGINE

[75] Inventors: Mitsunori Takao, Kariya; Toshiaki Mizuno, Nagoya, both of Japan

[73] Assignee: Toyota Jidosha Kogyo Kabushiki Kaisha, Toyota, Japan

[21] Appl. No.: 294,154

[22] Filed: Aug. 19, 1981

[30] Foreign Application Priority Data

Aug. 19, 1980 [JP] Japan ................................ 55-112947

[51] Int. Cl.³ .......................... F02B 5/02; F02D 5/02; G06F 15/20
[52] U.S. Cl. .............................. 364/431.05; 123/339; 123/417; 123/480
[58] Field of Search ................. 364/431.05, 431.04, 364/431.03; 123/416, 440, 480, 486, 417, 339

[56] References Cited

U.S. PATENT DOCUMENTS

| | | | |
|---|---|---|---|
| 3,906,207 | 9/1975 | Rivere et al. | 364/425 |
| 4,010,717 | 3/1977 | Taplin | 364/431.05 |
| 4,073,270 | 2/1978 | Endo | 364/431.05 |
| 4,155,332 | 5/1979 | Yaegashi et al. | 364/431.05 |
| 4,200,064 | 4/1980 | Engele | 123/440 |
| 4,201,161 | 5/1980 | Sasayama et al. | 123/416 |
| 4,214,306 | 7/1980 | Kobayashi | 364/431 |

Primary Examiner—Felix D. Gruber
Attorney, Agent, or Firm—Kenyon & Kenyon

[57] ABSTRACT

A method for controlling an internal combustion engine by controlling the amount of the fuel injection and the ignition timing of the engine using the output signal of a computer which takes the signals produced by the air intake pressure sensor and the rotational speed sensor, calculates the air intake pressure difference $\Delta Pm$ between the preceding and the present time unit and the rotational speed difference $\Delta N$ between the preceding and the present time unit, calculates the correction value from the calculated $\Delta Pm$ and $\Delta N$, and modifies the control value for the engine.

12 Claims, 13 Drawing Figures

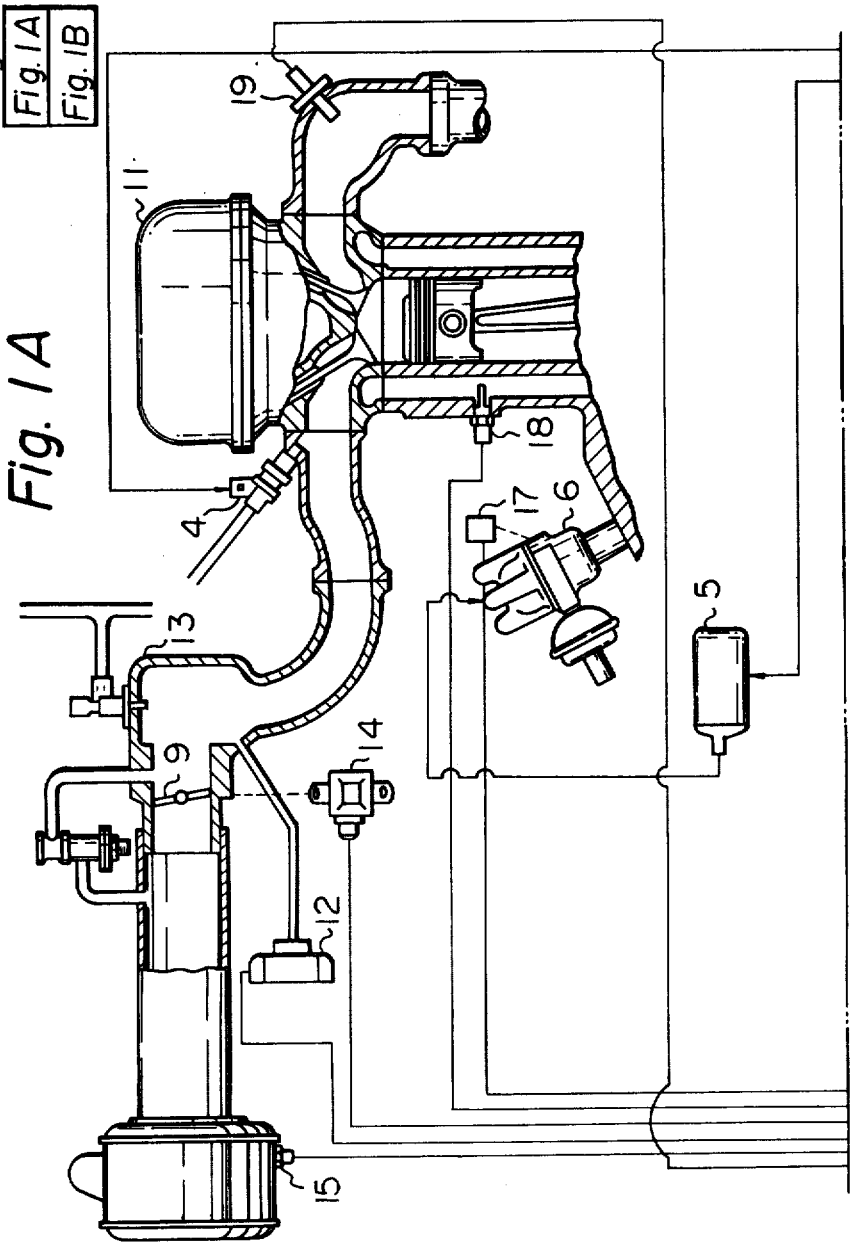

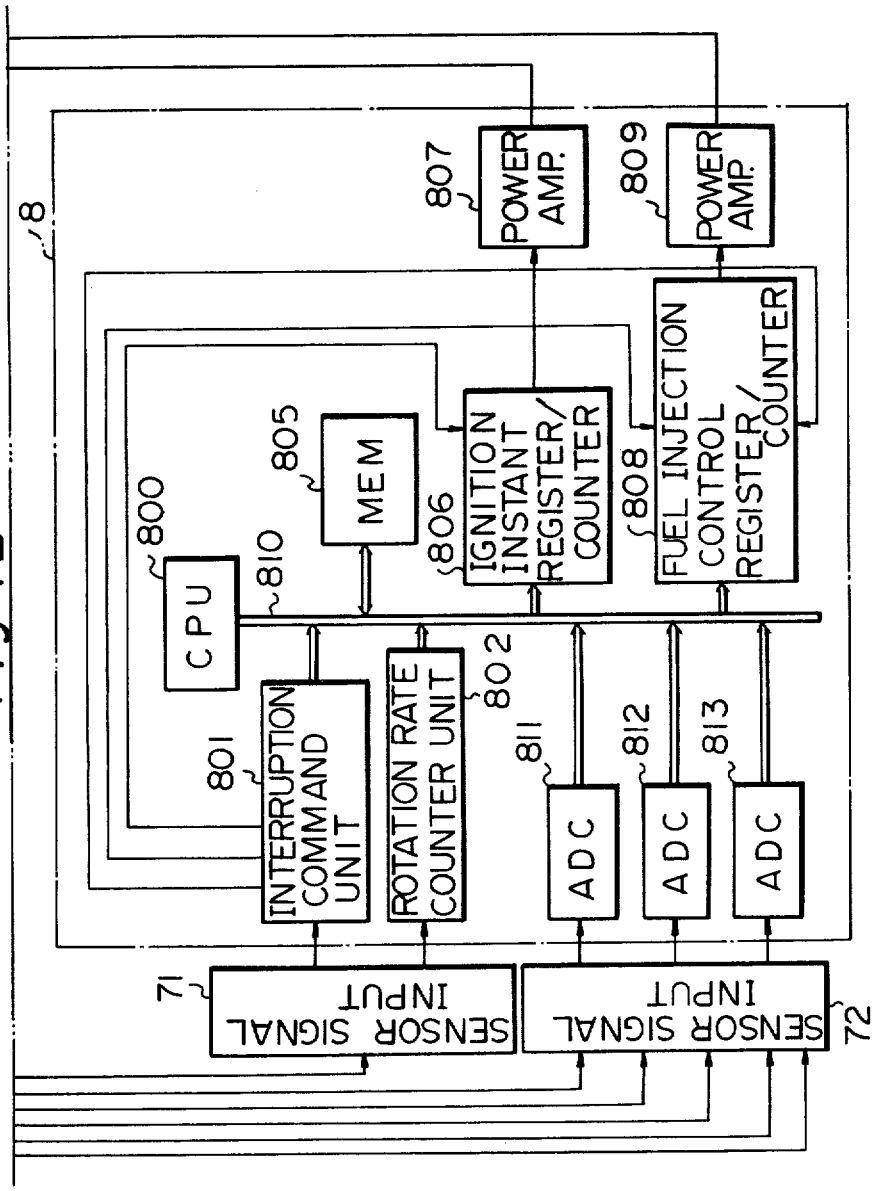

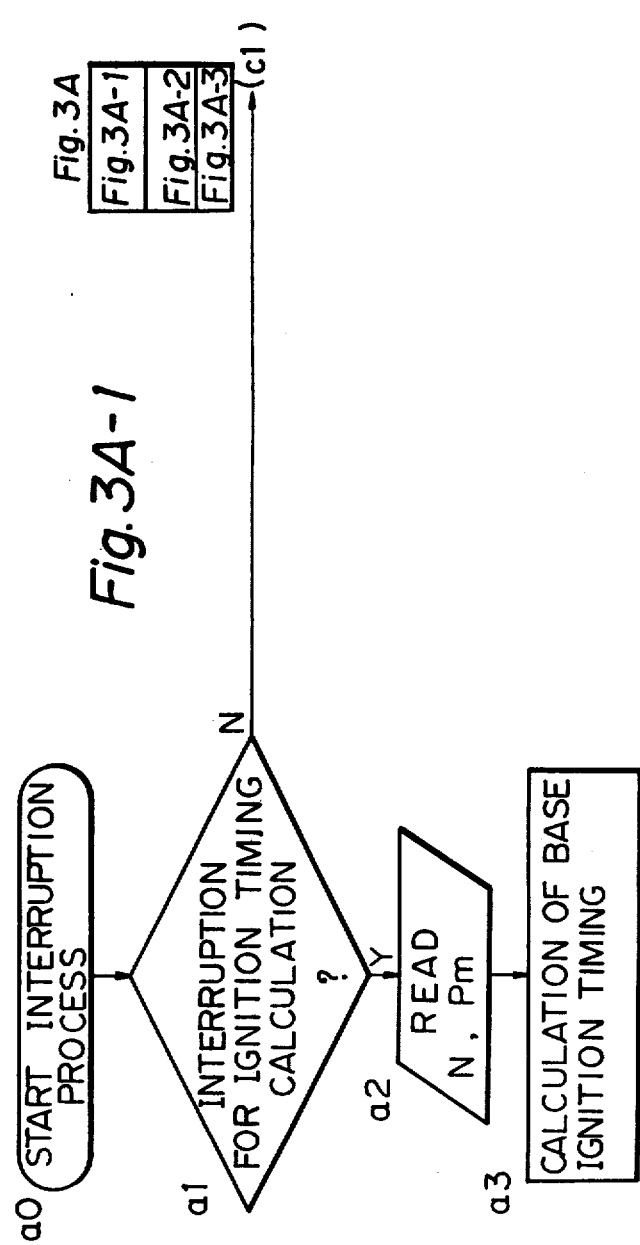

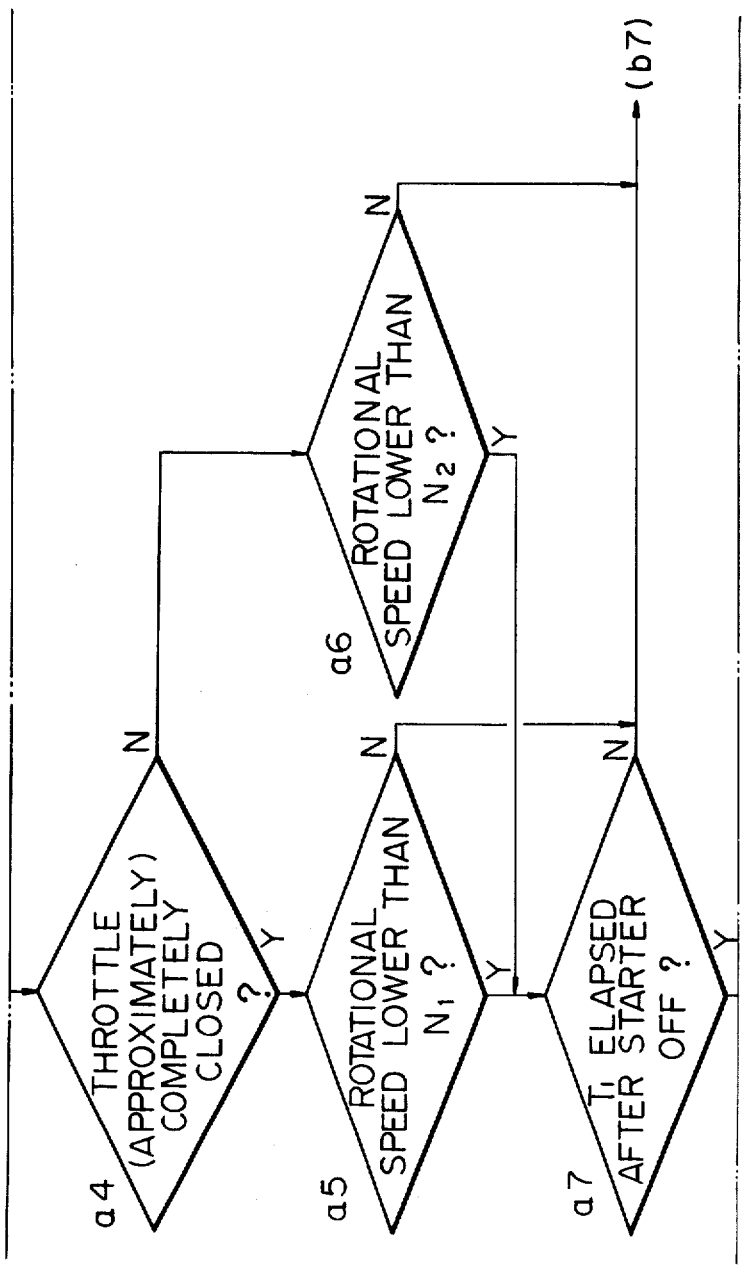

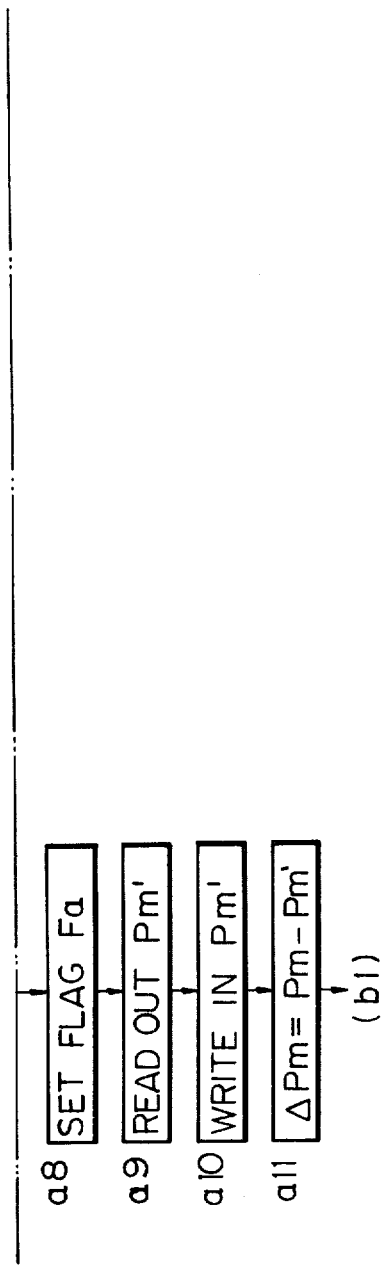

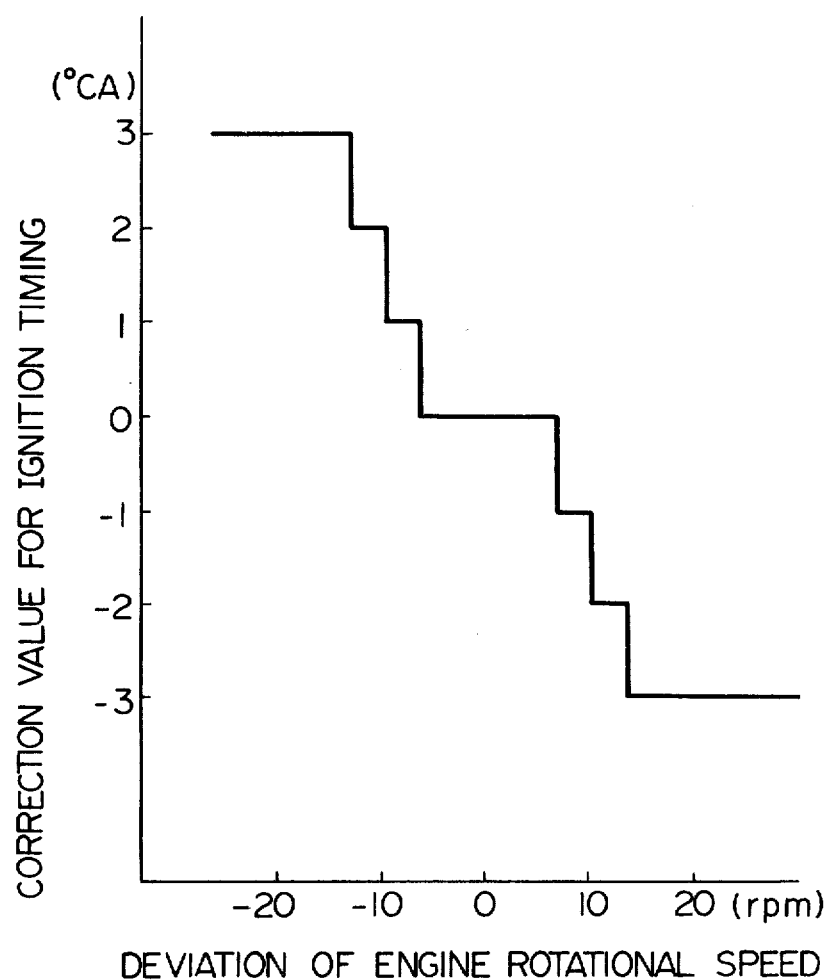

METHOD AND APPARATUS FOR CONTROLLING AN INTERNAL COMBUSTION ENGINE

TECHNICAL FIELD

The present invention relates to a method and an apparatus for controlling an internal combustion engine. The method and the apparatus for controlling an internal combustion engine according to the present invention can be used, for example, for controlling an internal combustion engine with an electronic fuel injecting device in which the rotational speed of the engine in the idle running condition and in the low speed running condition is controlled in accordance with the amount of the fuel injected and the ignition timing.

BACKGROUND ART

In general, in controlling the amount of fuel injection of an internal combustion engine with an electronic fuel injecting device of the speed density type, the base amount of the fuel injection is determined so as to realize an approximate stoichiometrical air fuel mixing ratio, which base amount is obtained by effecting the rotational speed correction to the amount of the fuel injection determined by the two dimensional map of the rotational speed and the air intake pressure or determined in accordance with the air intake pressure. The thus determined base amount of the fuel injection is corrected by the coolant temperature, the intake air temperature, the battery voltage, and the like, and the corrected base amount of the fuel injection is used for control. The base amount of the fuel injection is determined mostly by the air intake pressure. The influence of the engine rotational speed on the base amount of the fuel injection is less than that of the air intake pressure.

In the above described internal combustion engine with an electronic fuel injecting device of the speed density type, when a disturbance is applied to the operation of the internal combustion engine which is running without load, both the rotational speed of the engine and the air intake pressure are caused to vary, and the amount of the fuel injection is caused to vary approximately in phase with the air intake pressure. Since the air intake system of the internal combustion engine with an electronic fuel injecting device of the speed density type includes a surge tank of a large volume, there occurs a phase difference between the variation of the rotational speed of the internal combustion engine and the variation of the air intake pipe pressure. Thus, a phase difference occurs between the variation of the rotational speed of the internal combustion engine and the variation of the amount of the fuel injection. Accordingly, as the rotational speed of the engine decreases, the air-fuel ratio becomes lean and the torque of the engine decreases, and accordingly the rotational speed of the engine further decreases. On the contrary, as the rotational speed of the engine increases, the air-fuel ratio becomes rich and the torque of the engine increases, and accordingly the rotational speed of the engine further increases. Therefore, variation of the rotational speed of the engine is amplified, whereby the rotational speed of the engine becomes unstable.

Under the above described situation, in the prior art internal combustion engine with an electronic fuel injecting device of the speed density type, the correction of the base amount of the fuel injection is carried out such that when the rotational speed of the engine increases over a predetermined rotational speed and the air intake pressure decreases below a predetermined pressure, the air-fuel ratio of the engine is made rich, while when the rotational speed of the engine decreases below a predetermined rotational speed and the air intake pressure increases over a predetermined pressure, the air-fuel ratio of the engine is made lean.

However, if a method for correction of the base amount of the fuel injection is adopted in which the air-fuel ratio is made rich when the air intake pressure decreases below a predetermined pressure, and is made lean when the air intake pressure increases over a predetermined pressure, it is not possible to expect the same control effect in all engines supplied by the manufacturer of the engines, because there are differences in the air intake pressures under the idle running condition of the supplied engines due to the slight differences that occur when engines are manufactured. Also, the air intake pressure under the idle running condition varies due to the friction of the engine, the long term variation of the air intake amount and the like, whereby the stability of the idle running and the exhaust gas emission tend to deteriorate. If an oxygen ($O_2$) sensor feedback system using a three-way catalyzer for cleaning the exhaust gas is adopted in the car on which the internal combustion engine is mounted, the stability of the idle running is seriously deteriorated due to the air-fuel ratio variation caused by the feedback operation when the above described correction of the base amount of the fuel injection on the basis of the air intake pressure is used. Further, if the volume of the surge tank is made large in order to increase the output of the engine, the phase difference between the variation of the rotational speed of the engine and the variation of the fuel injection is caused to be enlarged and accordingly the rotational speed of the engine becomes unstable.

DISCLOSURE OF THE INVENTION

The present invention is proposed in order to solve the above described problems in the prior art internal combustion engine with an electronic fuel injecting device.

It is the main object of the present invention to provide an improved method and apparatus for controlling an internal combustion engine in which, upon variation of the rotational speed of the engine, the variation is reduced in a relatively short time so as to reduce the vibration which is uncomfortable for the driver, whereby the influence of the difference in the operating characteristic of individual engines and the influence of the long term variation of the amount of the air intake in the idle running condition are minimized, and reliable control of the internal combustion engine is achieved.

In accordance with the present invention there is provided a method for controlling an internal combustion engine having a sensor for sensing the air intake pressure of the engine and producing a signal corresponding to the sensed air intake pressure, a sensor for sensing the rotational speed of the engine and producing a signal corresponding to the sensed rotational speed and a computer for calculating a control valve using said produced signals of the sensed air intake pressure and the sensed rotational speed and producing at least a signal corresponding to said control value, said produced control value signal being used for controlling the operation of said engine; wherein the calculation carried out in said computer comprises the steps of: taking the signals produced by said sensor for sensing the air intake pressure and said sensor for sensing the rotational speed successively at selected intervals, calculating the value $\Delta Pm$, which is the difference between the signal of the air intake pressure sensor in the preceding time unit and the signal of the air intake pressure sensor in the present time unit, and the value $\Delta N$, which is the difference between the signal of the rotational speed sensor in the preceding time unit and the signal of the rotational speed sensor in the present time unit, calculating a correction value from said calculated values $\Delta Pm$ and $\Delta N$, and of modifying the control value for controlling the operation of said engine by said calculated correction value.

BRIEF DESCRIPTION OF THE DRAWINGS

FIG. 1 illustrates an apparatus for controlling an internal combustion engine in accordance with an embodiment of the present invention;

FIGS. 3A, 3B, 3C and 3D illustrate flow charts of the operation of the apparatus of FIG. 1; and FIGS. 4 and 5 illustrate the predetermined changes of the correction values of correction for the amount of the fuel injection and the ignition instant in accordance with the variation of the rotational speed of the engine.

DESCRIPTION OF THE PREFERRED EMBODIMENTS

Figure 2:
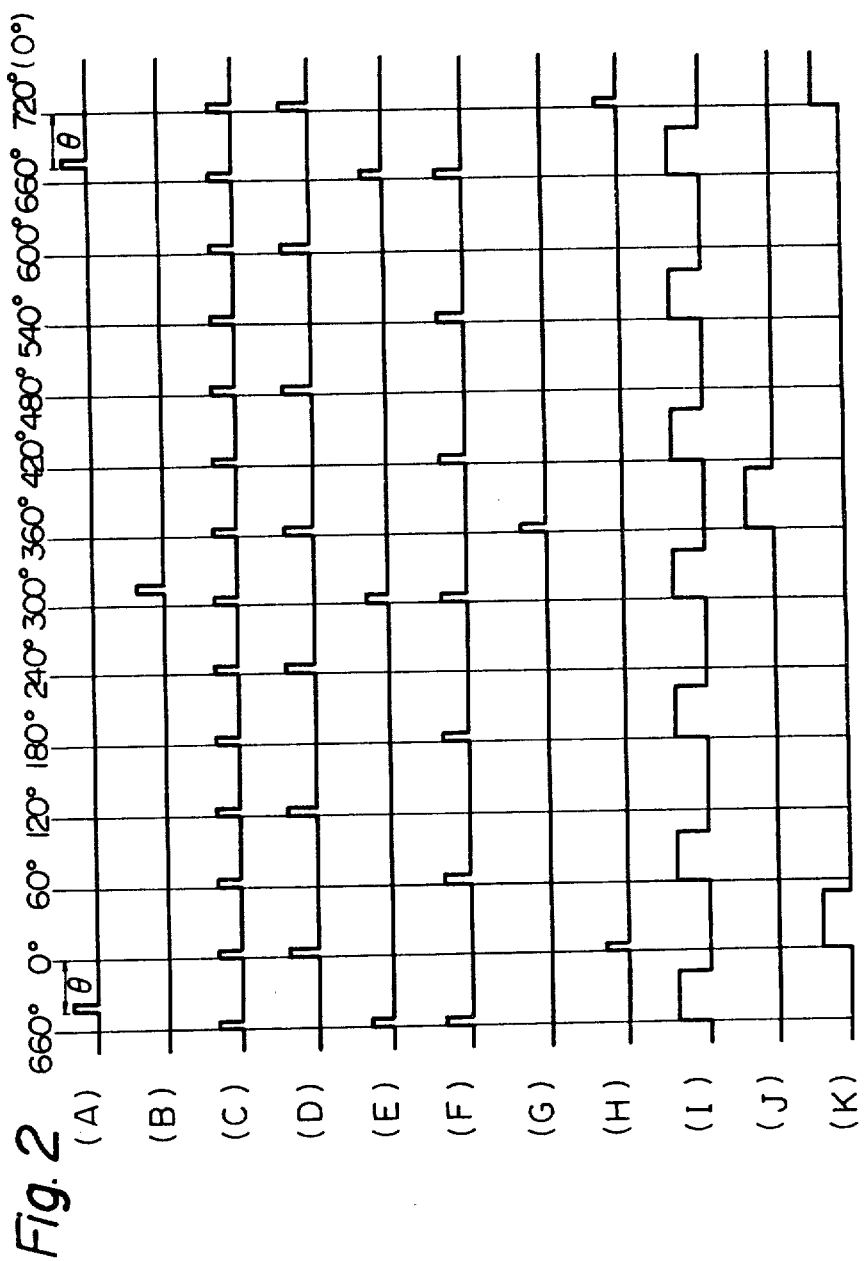
FIG. 2 illustrates a time chart of the signals appearing in the portions of the apparatus of FIG. 1.
Figure 3B:
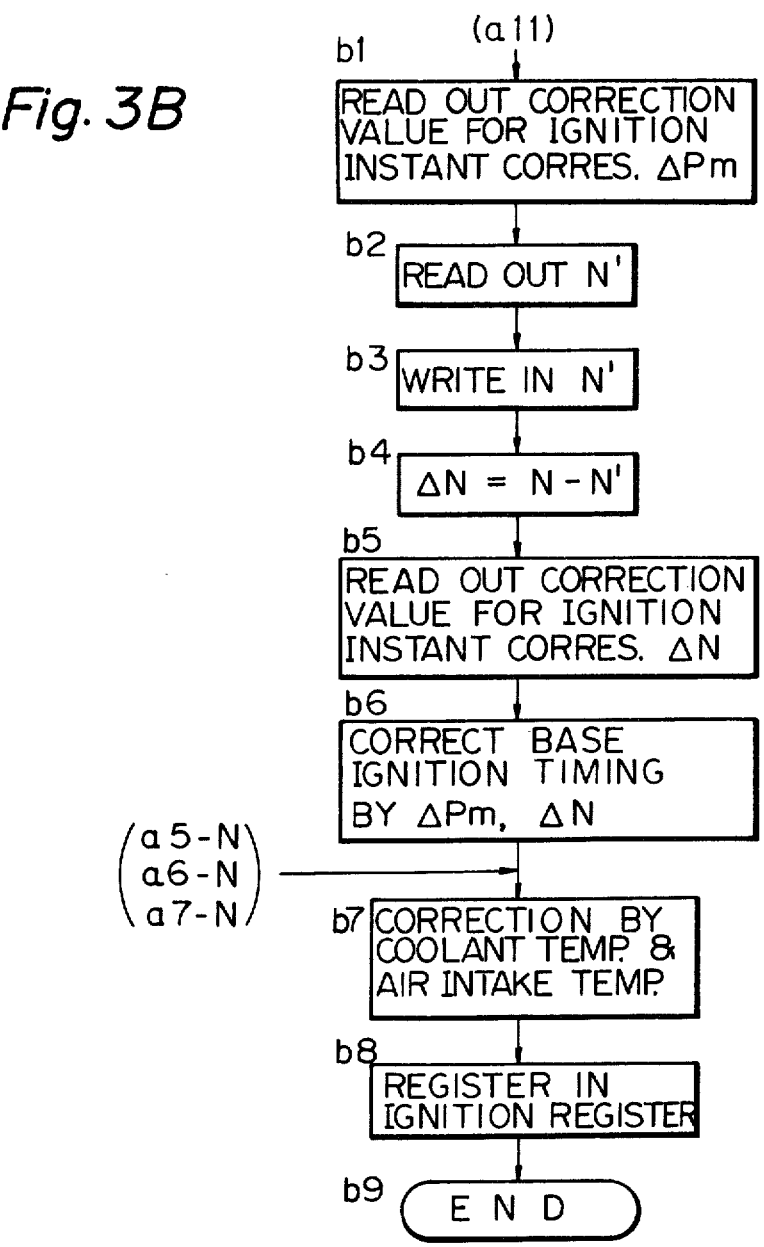
Figure 3C:
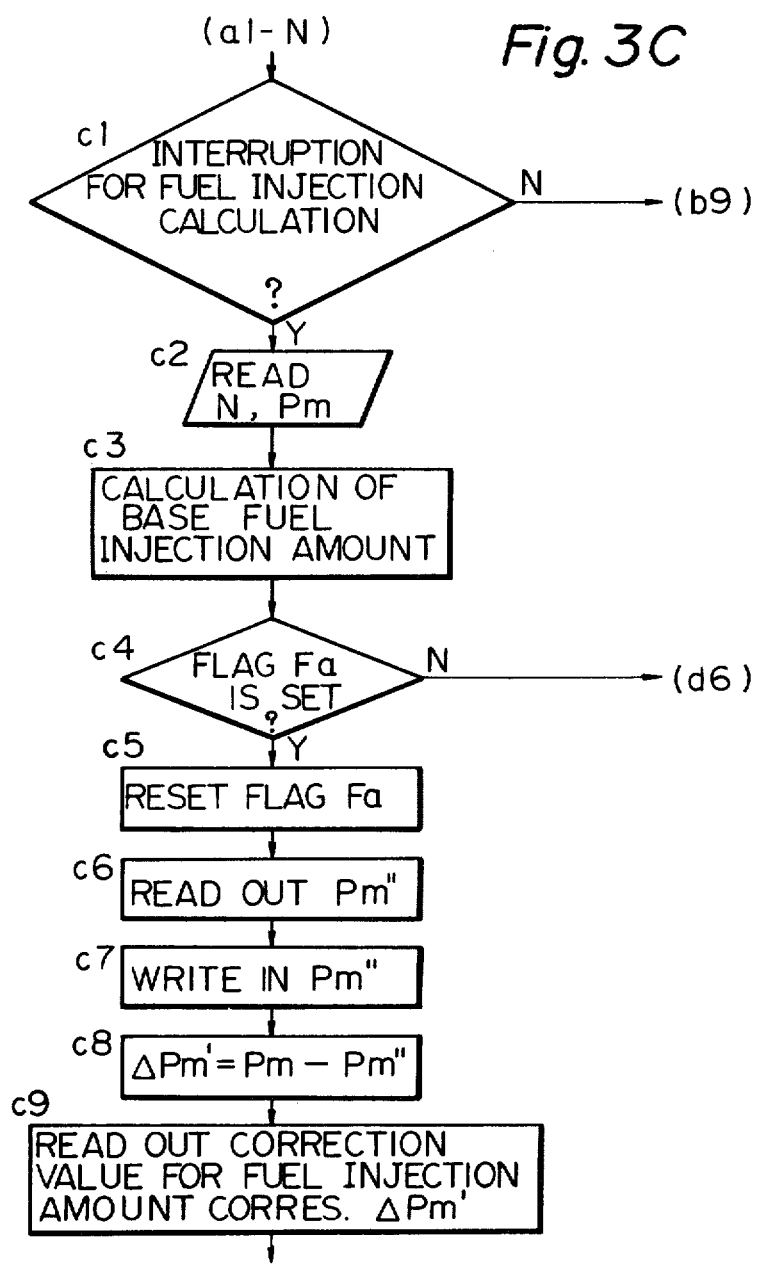
Figure 3D:
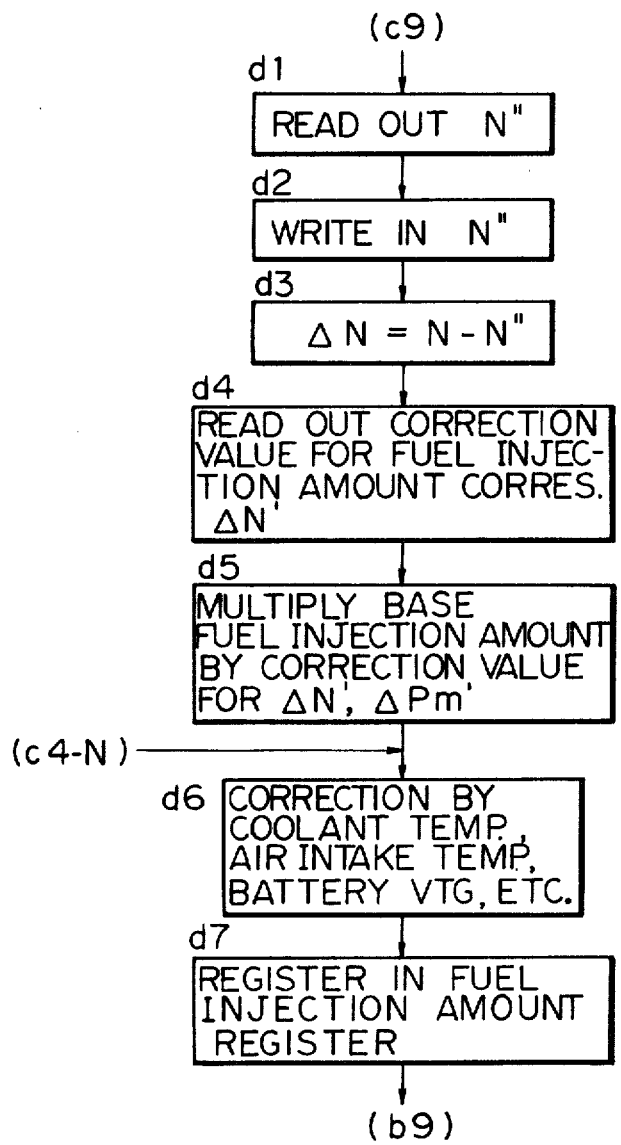

An apparatus for controlling an internal combustion engine in accordance with an embodiment of the present invention is illustrated in FIG. 1. The internal combustion engine 11 is of the six cylinder type. Air brought in through an air cleaner is sent to the engine 11 via a throttle valve 9 and an intake manifold 13. A semiconductor pressure sensor 12 for sensing the pressure of the intake manifold 13 is provided. A fuel injection valve 4 for injecting the fuel under regulated pressure is provided adjacent to the intake port of the cylinder of the engine 11. An ignition system comprising an ignition coil 5 and a distributor 6 is provided. A rotational angle sensor unit 17 for sensing preselected rotational angles of the engine is provided in the distributor 6, which rotates once every two rotations of the crank shaft of the engine. A throttle sensor 14 for sensing the perfect closure or the approximately perfect closure of the throttle valve 9, an air intake temperature sensor 15 for sensing the temperature of the air intake, and a coolant temperature sensor 18 for sensing the temperature of the coolant water which represents the warmed-up condition of the engine are provided.

A computer unit 8 is provided for carrying out the control of the engine in accordance with the signals produced in the above described sensors. The signals from the sensors are supplied to the computer unit 8 via sensor signal inputting circuits 71 and 72. The computer unit 8 comprises a central processor unit (CPU) 800, a common bus 810, an interruption commanding unit 801, a counter unit 802 for counting the rotations, analog-to-digital (A-D) converters 811, 812 and 813, a memory unit 805, a register/counter unit 806 for controlling the ignition instant, a register/counter unit 808 for controlling the time for the fuel injection, and power amplifiers 807 and 809.

A time chart of the signals appearing in the portions of the apparatus of FIG. 1 is illustrated in FIG. 2. The rotational angle sensor unit 17 produces the signals (A), (B) and (C) which are supplied to the interruption commanding unit 801 and the counter unit 802 for counting the rotations through the sensor signal inputting circuit 71. The interruption commanding unit 801 produces the interruption commanding signals (D) and (E). The pulse (D) is phase-shifted by 60° CA to produce the pulse (F). The signal (G) which indicates the top dead center of the sixth cylinder is obtained from the signals (B) and (C). The signal (H) which indicates the top dead center of the first cylinder is obtained from the signals (A) and (C). The counting period of the counter 806 is represented by the wave form (I). The counting-down is started with the pulse (F) and is completed at the trailing edge of the wave form (I). The trailing edge of the wave form (I) represents the ignition timing. The fuel is injected into the first, the fifth and the third cylinders in accordance with the fuel injection pulse (J), and is injected into the second, fourth and the sixth cylinders in accordance with the fuel injection pulse (K).

The signals from the coolant temperature sensor 18, the throttle sensor 14, the pressure sensor 12 and the air intake temperature sensor 15 are supplied to the A-D converters 811, 812 and 813 through the sensor signal inputting circuit 72. The interruption commanding unit 801 commands the interruption process of the calculation of the amount of the fuel injection and the calculation of the ignition timing through the common bus 810 to the CPU 800 in accordance with the signals of the rotational angles from the rotational angle sensor unit 17. The timing signal for controlling the starting instant of the operation is supplied to the register/counter unit 806 for controlling the ignition timing and to the register/counter 808 for controlling the fuel injection time. The counter unit 802 for counting the rotations receives the signal from the rotational angle sensor unit 17 and counts the period of a predetermined rotational angle, using a clock signal, with a predetermined frequency so that the rate of rotations N of the engine is calculated. The signals from the coolant temperature sensor 18, the throttle sensor 14, the pressure sensor 12 and the air intake temperature sensor 15 are analog-to-digitally converted in the A-D converters 811, 812 and 813 and the converted signals and read-in by the CPU 800 via the common bus 810. In the memory unit 805, the control program of the CPU and the data from the units 801, 802, 811, 812 and 813 are stored.

The register/counter unit 806 produces a signal for controlling the ignition timing from a digital signal representing the duration of the current through the ignition coil and the timing of the current shut down, which are calculated in the CPU 800. The output signal of the unit 806 is amplified by the power amplifier 807. The output signal of the power amplifier 807 is supplied to the ignition coil 5 and controls the timing of the current shut down of the ignition coil 5. The register/counter unit 808 for controlling the fuel injection duration converts the digital signal representing the valve opening duration of the fuel injection valve 4, which is calculated by the CPU 800, that is the amount of the fuel injection, into a pulse signal having a pulse width determining the valve opening duration of the fuel injection valve 4. The output signal of the unit 808 is amplified by a power amplifier 809, the output signal of which is supplied to the fuel injection valve 4.

The interruption commanding unit 801 receives the rotational angle signals from the rotational angle sensor unit 17 and produces a signal for commanding the interruptions for the calculation of the ignition timing and the calculation of the amount of the fuel injection.

In FIG. 2, the interruption commanding signal (D) is half the frequency of the rotational angle signal (C) of the rotational angle sensor unit and is produced immediately after the rotational angle signal (A) of the rotational angle sensor unit. The signal (D) is produced six times in every two rotations of the crankshaft of the engine. As the engine 11 is of the six cylinder type, the signal (D) is produced once every 120° CA. The signal (D) commands the CPU 800 to carry out the interruption for the calculation of the ignition timing. The interruption commanding unit 801 divides the frequency of the signal (C) of the rotational angle sensor unit by six so that the interruption commanding signal (E) is produced at every 360° CA from the 300° CA of the engine. That is, the signal (E) is produced at the sixth step after the production of the rotational angle signals (A) and (B) of the rotational angle sensor unit. The interruption commanding signal (E) is the signal for commanding the computer circuit 8 to carry out the interruption for the calculation of the amount of the fuel injection.

The operation of the apparatus of FIG. 1 is illustrated in the flow charts of FIGS. 3A, 3B, 3C and 3D. When the engine is started and the interruption commanding signals (D) and (E) for calculating the ignition timing or the amount of the fuel injection are supplied, the CPU 800 interrupts the process of the main routine and commands the interruption process of Step a0. When the interruption commanding signal (D) for calculating the ignition instant is supplied, Step a1 proceeds to Step a2, where the signal N, representing the rotational angle, of the engine obtained by the counter unit 802 for counting the rotational speed and the air intake pressure Pm, obtained by the A-D converter units 811 through 813, are read-out from the RAM of the memory unit 805. In step a3, the base ignition timing is obtained from the memory unit 805 where the relationship between the ignition timing, the rotational speed and the air intake pressure is stored in the form of a two dimensional map.

The determination whether or not the conditions are established for executing the correction of the control value, such as the ignition timing and the amount of the fuel injection, is carried out in Steps a4, a5, a6 and a7. If the conditions are not established, the process proceeds to Step b7. If the conditions are established, the correction flag which represents the allowability of the correction of the control value of the engine is selected in Step a8 so as to indicate that the correction is allowable.

In Step a9, the signal Pm' of the air intake pressure in the preceding operation time unit is read-out by the CPU 800 from the memory unit 805. In Step a10, the signal Pm' which has been read-in in Step a2 is written-in to the RAM of the memory unit. The thus written-in signal Pm' is used as the signal Pm' in the next operation time unit for the interruption process for controlling the ignition timing. In Step a11, the deviation $\Delta Pm$ of the air intake pressure is obtained as $\Delta Pm = Pm - Pm'$. In Step b1, the correction value for the ignition timing corresponding to $\Delta Pm$ is read-out from the map indicating the correction value for the ignition timing stored in the ROM region of the memory unit 805.

The processing of the signal representing the rotational speed N is carried out in Steps b2, b3, b4 and b5 in a similar manner as in Steps a9, a10, a11 and a12 for the signal Pm. Accordingly, the correction value for the ignition timing corresponding to the deviation $\Delta N$ of the rotational speed is read-out from the map for the correction of the ignition instant stored in the ROM region of the memory unit 805.

In Step b6, the correction values for the ignition instant corresponding to $\Delta Pm$ and $\Delta N$ are added to the base value of the ignition timing. In step b7, a correction for the coolant temperature and the air intake temperature is applied to the ignition timing after the correction for $\Delta Pm$ and $\Delta N$ has been carried out. The thus corrected amount is registered in the register of the counter unit 806 in Step b8. Thus, the interruption process is completed in Step b9.

When the interruption commanding signal (E) is supplied, the process proceeds from Step a1 via Step c1 to Step c2 where the signals N and Pm are read-out similarly as in Step a2. In Step c3, the calculation of the base value of the fuel injection is carried out using the obtained signal N and Pm. If it is determined in Step c4 that the correction flag Fa is established due to the latest interruption calculation for the ignition timing, the process proceeds to Step c5 where the correction flag Fa is reset. In Steps c6, c7, c8, c9, d1, d2, d3 and d4 procedures similar to those of Steps a9, a10, a11, b1, b2, b3, b4 and b5 are carried out so that the correction value for the base amount of the fuel injection corresponding to the deviation $\Delta Pm'$ of the air intake pressure and the deviation $\Delta N'$ of the rotational speed is obtained. In Step d5, the correction value for the base amount of the fuel injection is multiplied by the correction ratio for $\Delta Pm'$ and $\Delta N'$. In Step d6, a correction is carried out to the amount of the fuel injection by using the values of the coolant temperature, the air intake temperature, the battery voltage and the like. The thus corrected amount is registered in the register of the counter unit 808 in Step d7. Thus, the interruption process is completed in Step b9.

Figure 4:
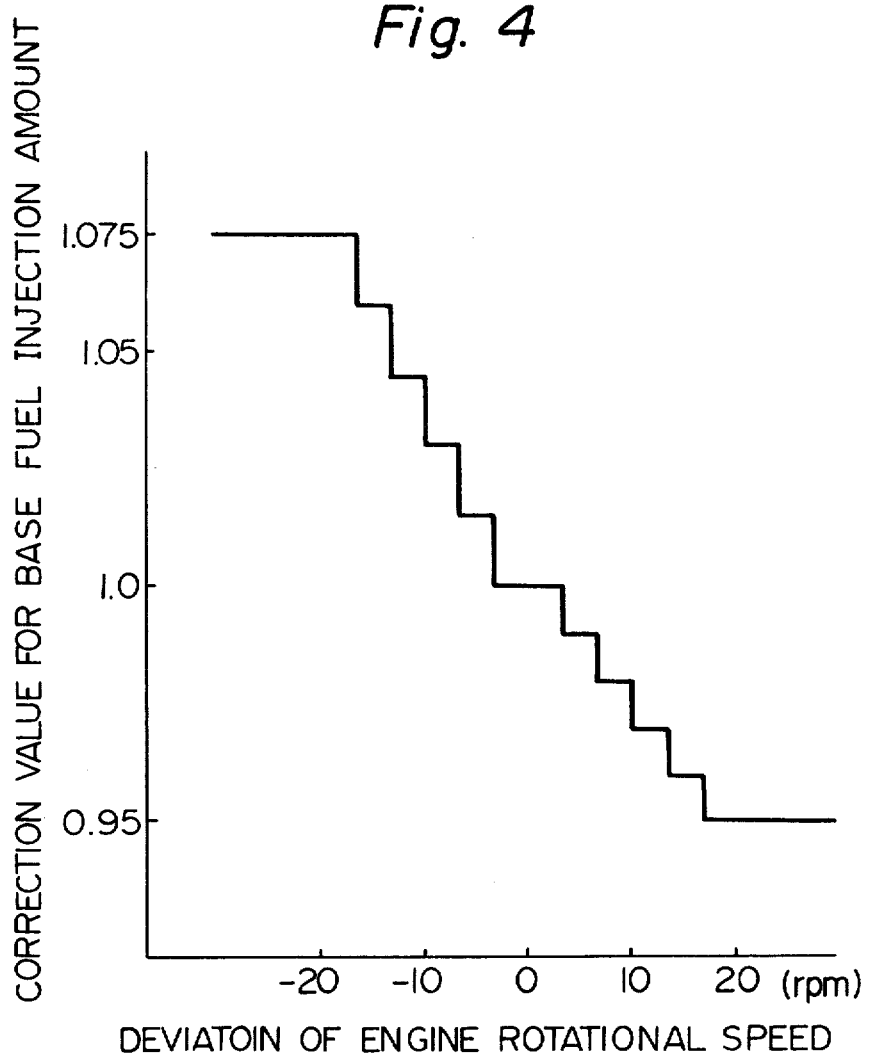

The predetermined change of the value of correction for the amount of the fuel injection for the ignition timing in accordance with the deviations of the rotational speed of the engine stored in the ROM the memory unit 805 is illustrated in FIGS. 4 and 5. As is illustrated in FIG. 4, when the rotational speed tends to decrease, i.e. the variation of the rotational speed is negative, the correction is carried out in the direction to increase the amount of the fuel injection, and hence the torque of the engine is caused to be increased, and accordingly the reduction of the rotational speed is prevented. Contrary to this, when the rotational speed tends to increase, i.e. the variation of the rotational speed is positive, the correction is carried out in the direction to decrease the amount of the fuel injection, and hence the torque of the engine is caused to be decreased, and accordingly the increase of the rotational speed is prevented. In this connection, since the amount of increase of the torque in the rich side is larger than the amount of decrease of the torque in the lean side with regard to the same amount of the variation of the air-fuel ratio, the correction value on the negative side is selected, on practice, larger than the correction value in the positive side.

Also, as is illustrated in FIG. 5, when the rotational speed tends to decrease, i.e. the variation of the rotational speed is negative, the correction is carried out in the direction of advancing the ignition timing and hence the torque of the engine is caused to be increased, and accordingly the decrease of the rotational speed is prevented. Contrary to this, when the rotational speed tends to increase, i.e. the variation of the rotational speed is positive, the correction is carried out in the direction of delaying the ignition timing and hence the torque of the engine is caused to be decreased, and accordingly the increase of the rotational speed is prevented. In FIG. 4, the abscissa represents the variation of the rotational speed of the engine in rpm and the ordinate represents the correction ratio for the amount of the base fuel injection. In FIG. 5, the abscissa represents the variation of the rotational speed of the engine in rpm and the ordinate represents the correction value for the ignition timing in °CA.

The corrections of the amount of the fuel injection and the ignition timing by the variation of the air intake pressure are carried out in a similar manner as the corrections by the variation of the rotational speed of the engine, as described above.

Although a preferred embodiment of the present invention is described hereinbefore, various modifications of the embodiment are possible. For example, the interruption process can be carried out at a predetermined time interval, instead of in response to a signal corresponding to a predetermined rotational angle of the crankshaft of the engine, as described above.

Also, the present invention is applicable to other multicylinder type internal combustion engines, such as four or eight cylinder types and mass flow type internal combustion engines, although the speed density type internal combustion engine of a six cylinder type is used in the above described embodiment.

We claim:

1. A method for controlling an internal combustion engine having a pressure sensor for sensing the air intake pressure of the engine and producing a signal corresponding to the sensed air intake pressure, a sensor for sensing the rotational angle of the engine and producing a signal corresponding to the sensed rotational angle, and a computer for calculating a control value using said produced signals of the sensed air intake pressure and the sensed rotational angle and producing at least one signal corresponding to said control value, said produced control value signal being used for controlling the operation of said engine; wherein the method comprises the steps of:

generating a control value for controlling the operation of the engine,
   sampling the signals produced by said air intake pressure sensor and said rotational angle sensor successively during time units at selected intervals,
   measuring the time between successive rotational angle signals,
   calculating an engine rotational speed N for each successive rotational angle signal in accordance with the corresponding time measurement,
   calculating for each time unit a value $\Delta Pm$ which is the difference between the signal of said air intake pressure sensor in the preceding time unit and the signal of the air intake pressure sensor in the present time unit and a value $\Delta N$ which is the difference between the calculated value N for the signal of said rotational angle sensor in the preceding time unit and the calculated value N for the signal of said rotational angle sensor in the present time unit,
   calculating a correction value from said calculated values $\Delta Pm$ and $\Delta N$,
   modifying the control value for controlling the operation of said engine by said calculated correction value, and
   delivering said modified control value to the engine.

2. A method as defined in claim 1, wherein the engine is a fuel-injection engine and said at least one control value signal for controlling the operation of the engine is a first signal controlling the amount of the fuel injection and a second signal controlling the ignition timing of the engine.

3. A method as defined in claim 1, wherein the engine is a fuel injection engine and wherein, when the rotational speed tends to decrease, the correction is carried out in the direction to increase the amount of the fuel injection, while when the rotational speed tends to increase, the correction is carried out in the direction to decrease the amount of the fuel injection.

4. A method as defined in claim 1, wherein, when the rotational speed tends to decrease, the correction is carried out in the direction of advancing the ignition angle, while when the rotational speed tends to increase, the correction is carried out in the direction of retarding the ignition angle.

5. A method as defined in claim 1, wherein the engine is a fuel injection engine and, when the air intake pressure tends to decrease, the correction is carried out in the direction to increase the amount of the fuel injection, while when the air intake pressure tends to increase, the correction is carried out in the direction to decrease the amount of the fuel injection.

6. A method as defined in claim 1, wherein, when the air intake pressure tends to decrease, the correction is carried out in the direction of advancing the ignition angle, while when the air intake pressure tends to increase, the correction is carried out in the direction of retarding the ignition angle.

7. An apparatus for controlling an internal combustion engine comprising a pressure sensor for sensing the air intake pressure of the engine and producing a signal corresponding to the sensed air intake pressure, a sensor unit for sensing the rotational angle of the engine and producing a signal corresponding to the sensed rotational angle, fuel supplying means for supplying a predetermined amount of fuel to said engine in accordance with a first control signal, ignition means for igniting said engine at a predetermined timing in accordance with a second control signal, and a computer for calculating control values using said produced signals of the sensed air intake pressure and the sensed rotational angle and producing said first control signal for said fuel supplying means and said second control signal for said ignition means, said computer having a central processor unit and a memory unit for storing predetermined programs and constants of the operation of said apparatus, wherein said computer comprises:

an interruption commanding unit,
   means for receiving and storing the signals produced by said air intake pressure sensor and said rotational angle sensor unit successively during time units at selected intervals in accordance with an interruption signal supplied by said interruption commanding unit of said computer,
   means for calculating a value $\Delta Pm$ which is the difference between the signal of said air intake pressure sensor in the preceding time unit and the signal of the pressure sensor in the present time unit,
   a clock for producing timing pulses,
   means responsive to said rotational angle signals and said timing pulses for calculating a rotational speed N of the engine,
   means for calculating a value $\Delta N$ which is the difference between the signal of the rotational angle sensor in the preceding time unit and the signal of said rotational angle sensor in the present time unit, means for calculating a correction value from said calculated values of ΔPm and ΔN, means for modifying at least one of said first and second control signals by said calculated correction value, and means for delivering said first and second control signals, as modified by said calculated correction value, to the fuel supplying means and the ignition means, respectively, for controlling the operation of the engine.

8. An apparatus as defined in claim 7, wherein the engine is a fuel injection engine and said interruption commanding unit comprises a memory unit in said computer for storing an interruption routine including a command to calculate the ignition timing and a command to calculate the amount of the fuel injection, said interruption commanding unit producing interruption signals on the basis of the signal of said rotational angle sensor, and said central processor unit calculates the ignition instant and the amount of the fuel injection in response to said interruption command signals.

9. A method for controlling an internal combustion engine having a pressure sensor for sensing the air intake pressure of the engine and producing a signal corresponding to the sensed air intake pressure, a sensor for sensing the rotational angle of the engine and producing a signal corresponding to the sensed rotational angle, and a computer for calculating a control value using said produced signals of the sensed air intake pressure and the sensed rotational angle and producing at least one signal corresponding to said control value, said produced control value signal being used for controlling the operation of said engine, wherein the method comprises the steps of:

generating a control value for controlling the operation of the engine, sampling the signals produced by said air intake pressure sensor and said rotational angle sensor successively during time units at selected intervals, measuring the time between successive rotational angle signals, calculating an engine rotational speed N for each successive rotational angle signal in accordance with the corresponding time measurement, calculating for each time unit a value ΔPm which is the difference between the signal of said air intake pressure sensor in the preceding time unit and the signal of the air intake pressure in the present time unit and a value ΔN which is the difference between the calculated value N for the signal of said rotational angle sensor in the preceding time unit and the calculated value N for the signal of said rotational angle sensor in the present time unit, calculating a correction value from said calculated values ΔPm and ΔN, modifying the control value for controlling the operation of said engine by said calculated correction value, and delivering said modified control value to the engine, wherein the method further comprises detecting the throttle valve position, the engine coolant temperature, and the air intake temperature in addition to sensing the air intake pressure and the rotational angle of the engine, determining the status of the engine on the basis of said detected and sensed values, and performing said method only when the status of the engine is in the idle condition or approximately in the idle condition after a predetermined length of time from the start of operation of said engine.

10. A method for controlling an internal combustion engine having a pressure sensor for sensing the air intake pressure of the engine and producing a signal corresponding to the sensed air intake pressure, a sensor for sensing the rotational angle of the engine and producing a signal corresponding to the sensed rotational angle, and a computer for calculating a control value using said produced signals of the sensed air intake pressure and the sensed rotational angle and producing at least one signal corresponding to said control value, said produced control value signal being used for controlling the operation of said engine, wherein the method comprises the steps of:

generating a control value for controlling the operation of the engine, sampling the signals produced by said air intake pressure sensor and said rotational angle sensor successively during time units at selected intervals, wherein said selected intervals are determined by a predetermined angle of rotation of the engine crank shaft, measuring the time between successive rotational angle signals, calculating an engine rotational speed N for each successive rotational angle signal in accordance with the corresponding time measurement, calculating for each time unit a value ΔPm which is the difference between the signal of said air intake pressure sensor in the preceding time unit and the signal of the air intake pressure in the present time unit and a value ΔN which is the difference between the calculated value N for the signal of said rotational angle sensor in the preceding time unit and the calculated value N for the signal of said rotational angle sensor in the present time unit, calculating a correction value from said calculated values ΔPm and ΔN, modifying the control value for controlling the operation of said engine by said calculated correction value, and delivering said modified control value to the engine.

11. A method for controlling an internal combustion engine having a pressure sensor for sensing the air intake pressure of the engine and producing a signal corresponding to the sensed air intake pressure, a sensor for sensing the rotational angle of the engine and producing a signal corresponding to the sensed rotational angle, and a computer for calculating a control value using said produced signals of the sensed air intake pressure and the sensed rotational angle and producing at least one signal corresponding to said control value, said produced control value signal being used for controlling the operation of said engine, wherein the method comprises the steps of:

generating a control value for controlling the operation of the engine, sampling the signals produced by said air intake pressure sensor and said rotational angle sensor successively during time units at selected intervals, said selected intervals having a predetermined length of time measuring the time between successive rotational angle signals, calculating an engine rotational speed N for each successive rotational angle signal in accordance with the corresponding time measurement, calculating for each time unit a value ΔPm which is the difference between the signal of said air intake pressure sensor in the preceding time unit and the signal of the air intake pressure in the present time unit and a value ΔN which is the difference between the calculated value N for the signal of said rotational angle sensor in the preceding time unit and the calculated value N for the signal of said rotational angle sensor in the present time unit, calculating a correction value from said calculated values ΔPm and ΔN, modifying the control value for controlling the operating of said engine by said calculated correction value, and delivering said modified control value to the engine.

12. A method for controlling an internal combustion engine having a pressure sensor for sensing the air intake pressure of the engine and producing a signal corresponding to the sensed air intake pressure, a sensor for sensing the rotational angle of the engine and producing a signal corresponding to the sensed rotational angle, and a computer for calculating a control value using said produced signals of the sensed air intake pressure and the sensed rotational angle and producing at least one signal corresponding to said control value, said produced control value signal being used for controlling the operation of said engine, wherein the method comprises the steps of:

detecting the fact that the engine is in the idle running condition or in the vicinity of the idle running condition, generating a control value for controlling the operation of the engine in the idle running condition, sampling the signals produced by said air intake pressure sensor and said rotational angle sensor successively during time units at selected intervals, measuring the time between successive rotational angle signals, calculating an engine rotational speed N for each successive rotational angle signal in accordance with the corresponding time measurement, calculating for each time unit a value ΔPm which is the difference between the signal of said air intake pressure sensor in the preceding time unit and the signal of the air intake pressure in the present time unit and a value ΔN which is the difference between the calculated value N for the signal of said rotational angle sensor in the preceding time unit and the calculated value N for the signal of said rotational angle sensor in the present time unit, obtaining a first correction amount from ΔPm for correcting the control value for controlling the operation of said engine, obtaining a second correction amount from ΔN for correcting the control value for controlling the operation of said engine, correcting the control value for controlling the operation of said engine in accordance with said obtained first and second correction amounts, and delivering said corrected control value to the engine when the engine is in the idle running condition or in the vicinity of the idle running condition.

* * * * *

UNITED STATES PATENT AND TRADEMARK OFFICE
CERTIFICATE OF CORRECTION

PATENT NO. : 4,479,186
DATED : October 23, 1984
INVENTOR(S) : Mitsunori Takao, et al.

It is certified that error appears in the above-identified patent and that said Letters Patent is hereby corrected as shown below:

Change the Name of the Assignee as follows:

From: "Toyota Jidosha Kogyo Kabushiki Kaisha" to

--NIPPONDENSO CO., LTD. and TOYOTA JIDOSHA KOGYO

KABUSHIKI KAISHA--.

The Assignment was recorded in the U.S. Patent and Trademark Office on August 19, 1981 on Reel 3911, Frames 018-022.

In the Specification:

Col. 3, line 11, after "values" insert --of--.

Col. 3, line 24, delete "of correction".

Col. 5, line 32, change "speed" to --angle--.

Col. 6, line 35, after "injection" insert --and--.

Signed and Sealed this

Fourth Day of June 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,479,186
DATED : October 23, 1984
INVENTOR(S) : Mitsunori Takao, et al.

It is certified that error appears in the above-identified patent and that said Letters Patent is hereby corrected as shown below:

Please change the name of the Assignee as follows:

From: "Toyota Jidosha Kogyo Kabushiki Kaisha" to

--NIPPONDENSO CO., LTD. and TOYOTA JIDOSHA KOGYO

KABUSHIKI KAISHA--.

The Assignment was recorded in the U.S. Patent and Trademark Office on August 19, 1981 on Reel 3911, Frames 018-022.

Signed and Sealed this

Twenty-fourth Day of September 1985

[SEAL]

Attest:

DONALD J. QUIGG

Attesting Officer

Commissioner of Patents and Trademarks—Designate